(12) United States Patent
Stephens

(10) Patent No.: US 8,009,601 B2
(45) Date of Patent: Aug. 30, 2011

(54) POWER SAVING WHEN USING AGGREGATED PACKETS

(75) Inventor: Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 10/975,767

(22) Filed: Oct. 27, 2004

(65) Prior Publication Data

US 2006/0087996 A1 Apr. 27, 2006

(51) Int. Cl.
*G08C 17/00* (2006.01)

(52) U.S. Cl. ......... 370/311; 370/312; 370/315; 370/329; 370/338; 370/441; 370/335; 370/342; 370/474

(58) Field of Classification Search .................. 370/311, 370/312, 473, 474, 300, 432, 315, 329, 338, 370/441, 335, 342
See application file for complete search history.

(56) References Cited

U.S. PATENT DOCUMENTS

| | | | |
|---|---|---|---|
| 5,809,024 A * | 9/1998 | Ferguson et al. | 370/395.53 |
| 6,212,182 B1 * | 4/2001 | McKeown | 370/390 |
| 6,477,169 B1 * | 11/2002 | Angle et al. | 370/395.42 |
| 6,665,520 B2 * | 12/2003 | Romans | 455/13.4 |
| 6,721,334 B1 * | 4/2004 | Ketcham | 370/473 |
| 6,856,603 B1 * | 2/2005 | Vollmer et al. | 370/311 |
| 6,870,840 B1 * | 3/2005 | Hill et al. | 370/389 |
| 6,895,006 B1 * | 5/2005 | Tasaki et al. | 370/390 |
| 6,973,081 B1 * | 12/2005 | Patel | 370/390 |
| 7,082,142 B1 * | 7/2006 | Begeja | 370/507 |
| 7,085,269 B2 * | 8/2006 | Sano | 370/390 |
| 2003/0031140 A1 | 2/2003 | Oprescu-Surcobe et al. | |
| 2004/0179475 A1 * | 9/2004 | Hwang et al. | 370/229 |
| 2005/0053033 A1 * | 3/2005 | Kelly et al. | 370/329 |
| 2005/0068895 A1 | 3/2005 | Stephens et al. | |
| 2005/0068900 A1 | 3/2005 | Stephens et al. | |
| 2005/0105535 A1 * | 5/2005 | Aaltonen et al. | 370/395.52 |
| 2005/0157667 A1 * | 7/2005 | Goldberg | 370/311 |
| 2005/0254444 A1 * | 11/2005 | Meier et al. | 370/312 |
| 2005/0259584 A1 * | 11/2005 | Chen et al. | 370/238 |

FOREIGN PATENT DOCUMENTS

| | | |
|---|---|---|
| EP | 1176780 A1 | 1/2002 |
| WO | 2006/047781 A2 | 5/2006 |

OTHER PUBLICATIONS

PCT/US2005/039323 International Search Report mailed Oct. 31, 2006.
International Preliminary Report on Patentability for PCT Application No. PCT/US2005/039323 mailed May 1, 2007, 6 pages.

* cited by examiner

*Primary Examiner* — Kwasi Karikari
(74) *Attorney, Agent, or Firm* — Cool Patent, P.C.; Joseph P. Curtin

(57) ABSTRACT

In a communications packet directed to multiple addresses and having a directory of the addresses in order of transmission, a device receiving the packet may use the directory to help determine when the last frame in which the device has an interest is received, and then enter a low power mode for the remainder of the packet reception. The device constructing the packet for transmission may arrange the frames in a manner that promotes overall power savings in the group of addressed devices.

12 Claims, 3 Drawing Sheets

POWER SAVING WHEN USING AGGREGATED PACKETS

BACKGROUND

In a typical network that uses a shared medium of communication, most of the transmissions received by each device are not addressed to that device. However, the device must keep listening, and processing the received signals, in case one of the transmissions is addressed to it. In some communications protocols, in a communications format sometimes referred to as an aggregated packet, different devices may be addressed in different frames of the same packet, so that each device must listen to the entire packet in case one or more of the frames are addressed to it. Some of those communication protocols are defined to provide information at or near the beginning of a packet about which devices will be addressed in that packet, so that non-addressed devices may simply ignore the rest of the packet. However, for devices that are indicated as 'to be addressed', each device must still listen to the entire packet in case later frames are addressed to it. If a device is only addressed near the beginning of the packet, it may waste a lot of resources, such as battery power, by unnecessarily receiving and processing the rest of the packet.

BRIEF DESCRIPTION OF THE DRAWINGS

The invention may be understood by referring to the following description and accompanying drawings that are used to illustrate some embodiments of the invention. In the drawings.

DETAILED DESCRIPTION OF THE INVENTION

Figure 1:
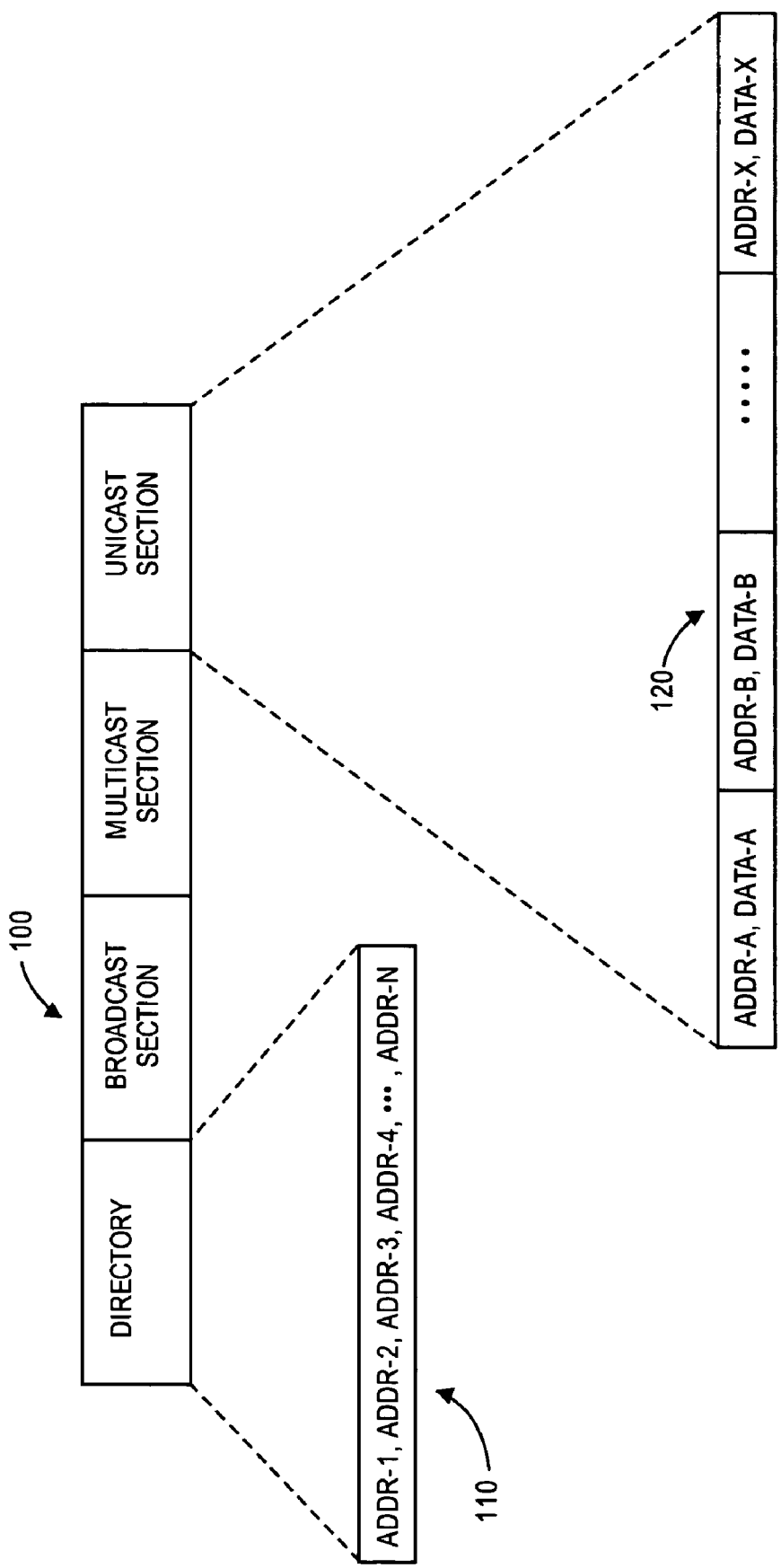
FIG. 1 shows a format of an aggregated packet, according to an embodiment of the invention.

In the following description, numerous specific details are set forth. However, it is understood that embodiments of the invention may be practiced without these specific details. In other instances, well-known circuits, structures, techniques, etc., have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, the different embodiments described my have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

The term "processor" may refer to any device or portion of a device that processes electronic data from registers and/or memory to transform that electronic data into other electronic data that may be stored in registers and/or memory. A "computing platform" may comprise one or more processors.

The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

The invention may be implemented in one or a combination of hardware, firmware, and software. The invention may also be implemented as instructions stored on a machine-readable medium, which may be read and executed by a computing platform to perform the operations described herein. A machine-readable medium may include any mechanism for storing, transmitting, or receiving information in a form readable by a machine (e.g., a computer). For example, a machine-readable medium may include read only memory (ROM); random access memory (RAM); magnetic disk storage media; optical storage media; and flash memory devices.

In various embodiments of the invention, when a communications packet containing different frames directed to different addresses has a directory of the addresses in their order of transmission, a device receiving the packet may use the directory to determine when the last frame is received in which the device has an interest, and then enter a low power mode for the remainder of the packet reception. The device constructing the packet for transmission may aid the power saving effort by arranging the frames in a manner that promotes overall power savings in the groups of addressed devices. Within the context of this document, a receiving device has an interest in a frame if the frame has an address that has been determined will cause the receiving device to receive, process, and if appropriate act upon, the frame.

FIG. 1 shows a format of an aggregated packet, according to an embodiment of the invention. The aggregated packet may comprise the information that is to be transmitted from one transmitting device to multiple receiving devices. In the illustrated embodiment, an aggregated packet 100 may comprise multiple sections, such as a directory, a broadcast section, a multicast section, and a unicast section. The packet may also contain other sections not specifically described here, depending on the requirements of the specific protocol being used (for example, the packet may include start and finish indicators to designate the beginning and end of the packet, packet type information to enable receiving devices to interpret the contents of the packet, handshaking information to enable more robust two-way communication, the length and/or time duration information for the packet, etc.) In some embodiments, specific packets may eliminate one or more of the sections if there is nothing to transmit in the associated section, or if the particular communications protocols place different sections in different packets.

The directory section 110, which might also be referred to as a table of contents, is broken out to show more detail in FIG. 1. Directory 110 may list the addresses to be included in the subsequent sections, and may list them in the order frames containing those addresses are to be transmitted. In some embodiments, each address may appear only once in the directory, even if multiple frames may be directed to the same address, in which case frames directed to the same address may be organized into a group of adjacent frames. Note: if only one frame in a packet contains a particular address, that frame may be considered a 'group' in the terminology used herein. The directory may be structured as one or more frames, referred to herein as directory frames for clarity, although various embodiments of the invention may have a directory structure that does not use a frame format. Example addresses are indicated as ADDR-1, ADDR-2, etc., through ADDR-N. Some addresses in the directory may be individual addresses to be used in the unicast section, i.e., each address is directed to a single receiving device. Some other addresses in the directory may be multicast addresses in the multicast section, i.e., each multicast address indicates that the associated content may be of interest to multiple receiving devices, each of which may receive, process, and/or act upon the contents of frames with that address. There may also be a broadcast address to indicate the associated content may be of interest to all receivers. A single receiving device may separately recognize a broadcast address, one or more multicast addresses, and its own unicast address as indicating frames containing content that may be of interest to it. Of course, a particular receiving device may also be configured to ignore the broadcast address and/or to ignore any or all multicast addresses. The decision as to whether a particular receiving device does or does not have an interest in particular addresses (i.e., whether the receiving device is to ignore or receive/process broadcast frames and/or frames with a particular multicast address may be made based on criteria that are beyond the scope of this document.

The directory may be followed by a broadcast section. In some embodiments a single default address (such as but not limited to an address consisting of all 1's) may be used to identify a broadcast, with the associated broadcast content included in the broadcast section. The broadcast section may be followed by a multicast section. The multicast section may be followed by a unicast section. Although the unicast section is shown last, in the interest of clarity it is described next. Any of the indicated sections may be eliminated for any feasible reason, such as but not limited to there being nothing to transmit in that section. In some embodiments, broadcast, multicast, and unicast addresses may be distinguished from each other by assigning particular address formats and/or address ranges to each of the three types of addresses.

In the illustrated breakout of FIG. 1, unicast section 120 is shown as having multiple frames, with each frame containing a destination address of the intended receiving device, thereby directing the associated data to the addressed receiving device. (Note: 'data', as the term is used in connection with these frames, may include commands, status reports, requests, etc.). The frame may also comprise other information, such as information related to the transmission or to the interpretation of the content rather than the content itself (e.g., frame type, block check characters, timing information, etc.). The illustrated embodiment lists address and data A, address and data B, etc., through the representative last address/data X. The unicast section may contain as many addresses and associated data as are feasible, depending on such things as the limitations of the systems and communications protocols, and on the available communications traffic.

The multicast section may have a similar format as the unicast section, but in some embodiments each address in the multicast section may be received and processed by multiple receiving devices rather than a single receiving device. By contrast, the broadcast section may be received and processed by any receiving device that is configured to do so.

Broadcast, multicast, and unicast frames may be referred to herein as addressed frames, since they each comprise a destination address for that particular frame. This may be in contrast with the directory, which although it contains addresses, it may not contain an address that specifies the intended recipient for the directory, although embodiments of the invention may not be limited in this manner. In some embodiments, multiple frames may have like addresses (i.e., the same destination address), and those multiple frames may be grouped together as adjacent frames. A group of adjacent frames with the same destination address may be referred to as an address group. In some embodiments, a single address in the directory may be used to indicate an address group with an unspecified number of frames that contain that address.

Figure 2:
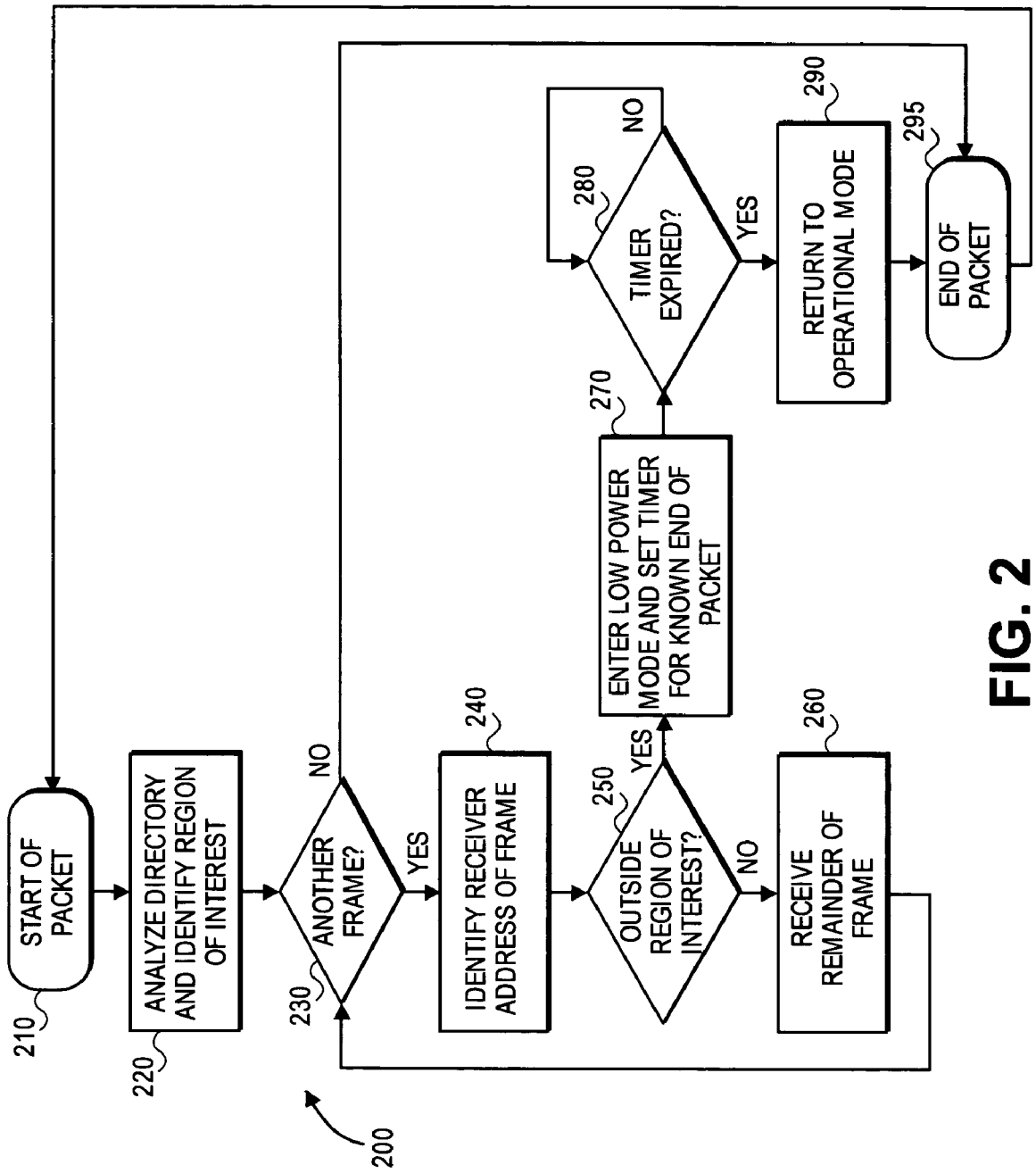
FIG. 2 shows a flow diagram of a method of receiving an aggregated packet, according to an embodiment of the invention.

FIG. 2 shows a flow diagram of a method of receiving an aggregated packet, according to an embodiment of the invention. In flow diagram 200, at 210 the starting frame(s) of the packet may be received by a receiving device. Such a receiving device may be any device that is able to receive the wireless transmission, such as but not limited to a wireless local area network (WLAN), wireless wide area network (WWAN), or wireless metropolitan area network (WMAN). The starting frame(s) may include transmission-related and other overhead information, as well as information not directly related to the embodiments of the invention described herein.

At 220 the directory, when received, may be analyzed to determine if the address(es) identified as relevant by the receiving device are listed in the directory, and the receiving device may identify a region of interest to it based on that analysis. The region of interest may begin at or before the first addressed frame, and may continue through the last addressed frame containing a destination address in which the receiving device has an interest. If the directory does not contain any addressed frame in which the receiving device has an interest, then the region of interest may never be created, or alternately may end approximately at or before the beginning of the addressed frames.

After establishing what the region of interest is, the receiving device may begin receiving the frames that are in the various sections. Unless the end of the packet has been reached and there are no more frames to receive, as determined at 230, the receiving device may begin receiving the current frame, and the address of the current frame may be identified at 240. If that address indicates this frame is within or before the region of interest at 250, processing on the current frame may continue as it normally would. For example, the receiving device may receive and process the frame at 260 if the address of the frame is an address in which the receiving device has an interest. Alternately, the receiving device may receive and ignore the remainder of the frame at 260 if the frame is within the region of interest but the address is not an address in which the receiving device has an interest. In some embodiments in which the length of the frame is known, the receiving device may enter a low power mode until the end of the frame.

The next frame may then be received at 230 (or if there are no more frames to receive, the end of the packet may be reached at 295). Processing may loop through 240, 250, and 260 as long as the received frame is within the region of interest. Once a frame is received that is determined to be outside the region of interest (thereby indicating there are no further frames with an address in which the receiving device has an interest), the receiving device may set a timer that will expire at, or approximately at, the end of the packet, and then enter a low power mode. In some embodiments the timer may be started earlier in the packet, such as but not limited to starting the timer when packet duration information is received early in the packet. In some embodiments the low power mode includes disabling the receiver so that little or no power will be consumed by the receiver circuitry. In some embodiments the receiving device may be scheduled to wake up a predetermined period of time before the end of the packet, to assure that the receiving device has time to perform all necessary operations in connection with returning to active operation before the beginning of the next packet is received.

When the timer expires at 280, indicating the approximate end of the packet, the receiving device may be returned to an operational mode at 290. The actual end of the packet at 295 may signal the start of the next packet at 210, and the process may begin again. In some embodiments, rather than using the timer of 270-280, an external indicator may be used to indicate the end of the packet and trigger a return to an operation mode.

In some embodiments the exact end of the region of interest may not be known until it has been passed. If all frames containing the last destination address of interest have been placed adjacent to each other in an address group, the receiving device may continue to receive and process frames with that destination address until the receiving device receives a frame that does not contain that destination address, thereby confirming that it has passed the region of interest. Other techniques may also be used.

Figure 3:
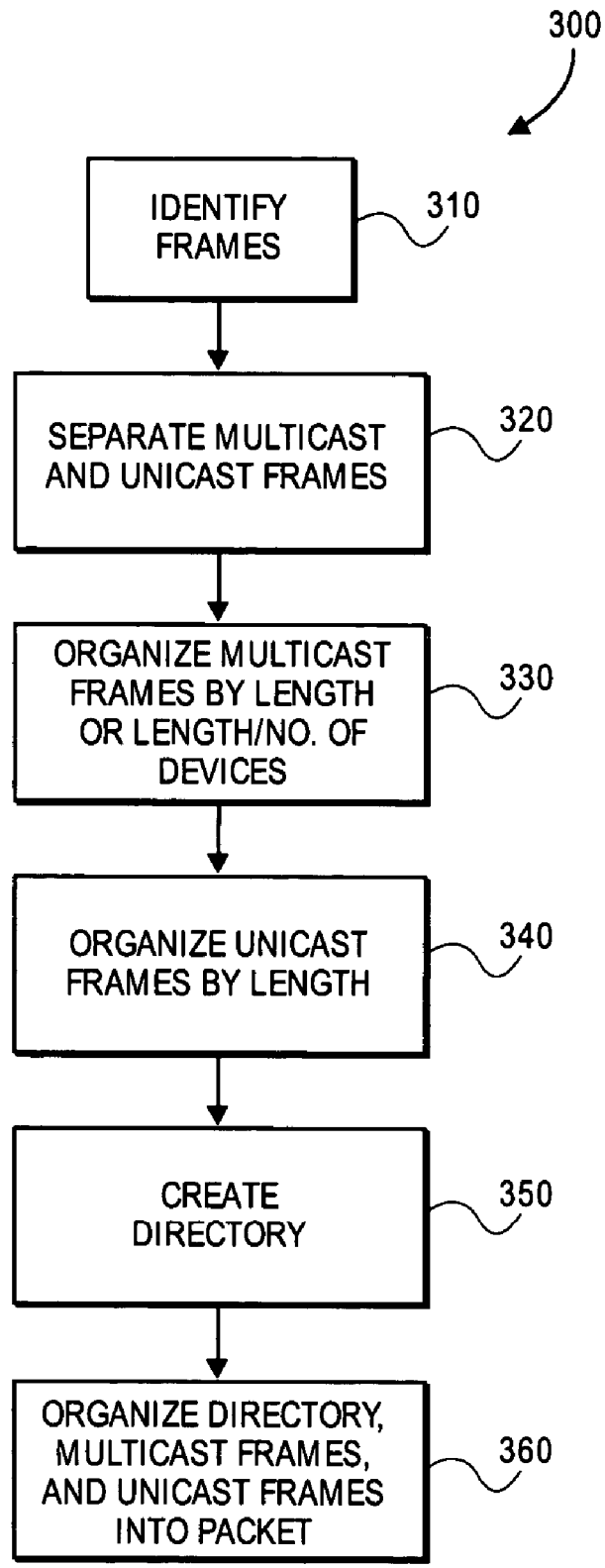
FIG. 3 shows a flow diagram of a method of organizing frames in an aggregated packet to reduce power consumption in the receiving devices, according to an embodiment of the invention.

FIG. 3 shows a flow diagram of a method of organizing frames in an aggregated packet to reduce power consumption in the receiving devices, according to an embodiment of the invention. The techniques previously described may be used in wireless receiving devices to reduce their own power consumption when receiving an aggregated packet. Flow diagram 300 illustrates techniques to construct the aggregated packet before transmission, techniques that may be used in the wireless device that transmits the aggregated packet, that may help to further reduce overall power consumption in the multiple receiving devices that receive the aggregated packet.

Flow diagram 300 begins at 310 with identifying the frames that are to be transmitted in the packet. Identification may be based on any feasible technique, such as but not limited to frames with time-sensitive content, frames in pre-designated address groupings, frames with similar content, frames marked with particular user priorities, etc. Once the frames have been identified, the frames may be separated at 320 into sections based on address type, such as broadcast frames in one section, multicast frames in another section, and unicast frames in still another section. Of course, one or more of those sections may be absent.

Within the multicast section, the multicast frames may be organized at 330 in a manner that is focused on trying to allow the largest number of devices to power down at the earliest opportunity. In a particular embodiment, the multicast frames may be organized into order by ascending length, with the shortest frame to be transmitted first in the multicast section and the longest frame to be transmitted last in the multicast section. This technique may be preferred if the transmitting device has no knowledge (or uncertain knowledge) of how many devices may be interested in receiving each multicast frame. Assuming each multicast address is directed to approximately the same number of devices, this technique will theoretically allow the greatest number of devices to power down earlier in the packet because this technique increases the number of multicast frames that are transmitted early in the multicast section.

If the transmitting device knows how many receiving devices will be interested in receiving each individual multicast frame, each multicast frame may be assigned a parameter derived by dividing the length of the frame by the number of devices interested in receiving that frame. The frames may then be organized into order by ascending value of that parameter, with the frame having the smallest value for that parameter being transmitted first in the multicast section and the frame having the largest value for that parameter being transmitted last in the multicast section. In this manner, frames directed to many devices will be transmitted earlier so that the greatest number of receiving devices may potentially be powered down early in the packet. Of course, if a given receiving device also has a unicast frame to be received later, it might not power down at any time during the multicast section, regardless of its length or parameter value.

The unicast frames may be placed into address groups so that frames having the same unicast address are grouped together. These groups may then be organized at 340 by ascending order of total frame length (i.e., the total length of all the frames in the same address group), with the group having the shortest total frame length to be transmitted first in the unicast section and the group having the longest total frame to be transmitted last in the unicast section.

Once the multicast and unicast sections have been individually organized as described above, a directory of frame addresses may be created at 350, listing the multicast addresses in the order derived at 330, followed by the unicast addresses in the order derived at 340.

At 360, the packet may be organized by placing the directory first, followed by the multicast section and then the unicast section. In some embodiments a broadcast section may also be placed between the directory and the multicast section, with the broadcast destination indicator(s), if any, placed before multicast addresses in the directory. In some embodiments all the various components of the packet may be placed into sequential memory locations in the order of transmission, but other embodiments may use other techniques (e.g., placing parts of the packet into different memory blocks at various memory locations, and using pointers to determine the order in which the blocks are to be retrieved from memory for transmission). Of course, the packet may also contain things other than those described herein, located in various parts of the packet. Such things may be implementation-specific, and are not described herein.

The forgoing description is intended to be illustrative and not limiting. Variations will occur to those of skill in the art. Those variations are intended to be included in the various embodiments of the invention, which are limited only by the spirit and scope of the appended claims.

What is claimed is:

1. An apparatus comprising a wireless communications device to construct a packet containing a directory structure followed by multiple addressed frames, the multiple addressed frames organized into groups containing like addresses, the directory structure containing a list of addresses in the addressed frames in an order the groups are to be transmitted;

wherein the addressed frames comprise a multicast section of frames containing multicast addresses and a unicast section of frames containing unicast addresses, the multicast section to be transmitted before the unicast section; and wherein frames or groups of frames containing like addresses and having shorter lengths are to be transmitted before frames or groups of frames containing like addresses and having longer lengths in the multicast section of frames or the unicast section of frames, or combinations thereof.

2. An apparatus comprising a wireless communications device to construct a packet containing a directory structure followed by multiple addressed frames, the multiple addressed frames organized into groups containing like addresses, the directory structure containing a list of addresses in the addressed frames in an order the groups are to be transmitted;
wherein a multicast section comprises frame groups arranged in order of length of the frame groups; and
wherein frames or groups of frames containing like addresses and having shorter lengths are to be transmitted before frames or groups of frames containing like addresses and having longer lengths in the multicast section.

3. An apparatus comprising a wireless communications device to construct a packet containing a directory structure followed by multiple addressed frames, the multiple addressed frames organized into groups containing like addresses, the directory structure containing a list of addresses in the addressed frames in an order the groups are to be transmitted;
wherein a multicast section comprises frame groups arranged in order of value of a parameter derived by dividing each frame group length by a quantity of devices having an interest in the frame group; and
wherein frames or groups of frames containing like addresses and having shorter lengths are to be transmitted before frames or groups of frames containing like addresses and having longer lengths in the multicast section.

4. An apparatus comprising a wireless communications device to construct a packet containing a directory structure followed by multiple addressed frames, the multiple addressed frames organized into groups containing like addresses, the directory structure containing a list of addresses in the addressed frames in an order the groups are to be transmitted;
wherein a unicast section comprises frame groups arranged in order of length of the frame groups; and
wherein frames or groups of frames containing like addresses and having shorter lengths are to be transmitted before frames or groups of frames containing like addresses and having longer lengths in the unicast section.

5. A method for constructing a packet in a communication system, the method comprising:
constructing a packet containing a directory structure followed by multiple addressed frames, the directory structure containing a list of addresses in the addressed frames in an order the addressed frames are to be transmitted;
wherein the addressed frames comprise a multicast section of frames and a unicast section of frames, the multicast section to be transmitted before the unicast section;
wherein each address in the list of addresses appears only once in the directory structure, and addressed frames are organized into groups of adjacent frames with a same address; and
wherein frames or groups of frames containing like addresses and having shorter lengths are to be transmitted before frames or groups of frames containing like addresses and having longer lengths in the multicast section of frames or the unicast section of frames, or combinations thereof.

6. The method of claim 5, wherein the groups of frames of the multicast section are arranged in order of length of the groups.

7. The method of claim 5, wherein the addressed frames of the multicast section are arranged in order of a value of a parameter derived by dividing a length of each particular group by a quantity of devices that are expected to have an interest in the frames of the particular group.

8. The method of claim 5, wherein the frame groups of the unicast section are arranged in order of length.

9. An article comprising
a machine-readable medium that provides instructions, which when executed by a computing platform, cause said computing platform to perform operations comprising:
constructing a packet containing as directory structure followed by multiple addressed frames, the multiple addressed frames organized into groups of frames having a like address, the directory structure containing a list of the like addresses in an order the groups of frames are to be transmitted;
wherein the addressed frames comprise a multicast section containing groups of frames with multicast addresses and a unicast section containing groups of frames with multicast addresses, the multicast section to be transmitted before the unicast section; and
wherein frames or groups of frames containing like addresses and having shorter lengths are to be transmitted before frames or groups of frames containing like addresses and having longer lengths in the multicast section of frames or the unicast section of frames, or combinations thereof.

10. An article comprising
a machine-readable medium that provides instructions, which when executed by a computing platform, cause said computing platform to perform operations comprising:
constructing a packet containing as directory structure followed by multiple addressed frames, the multiple addressed frames organized into groups of frames having a like address, the directory structure containing a list of the like addresses in an order the groups of frames are to be transmitted;
wherein the groups in a multicast section are arranged in order of length of the groups; and
wherein frames or groups of frames containing like addresses and having shorter lengths are to be transmitted before frames or groups of frames containing like addresses and having longer lengths in the multicast section.

11. An article comprising
a machine-readable medium that provides instructions, which when executed by a computing platform, cause said computing platform to perform operations comprising:
constructing a packet containing as directory structure followed by multiple addressed frames, the multiple addressed frames organized into groups of frames having a like address, the directory structure containing a list of the like addresses in an order the groups of frames are to be transmitted;
wherein the groups in a multicast section are arranged in order of a value of a parameter derived by dividing a length of each particular group by a quantity of devices that are expected to have an interest in frames in the particular group; and wherein frames or groups of frames containing like addresses and having shorter lengths are to be transmitted before frames or groups of frames containing like addresses and having longer lengths in the multicast section.

12. An article comprising
a machine-readable medium that provides instructions, which when executed by a computing platform, cause said computing platform to perform operations comprising:
constructing a packet containing a directory structure followed by multiple addressed frames, the multiple addressed frames organized into groups of frames having a like address, the directory structure containing a list of the like addresses in an order the groups of frames are to be transmitted; and
wherein the groups in a unicast section are arranged in order of length of each group;
wherein frames or groups of frames containing like addresses and having shorter lengths are to be transmitted before frames or groups of frames containing like addresses and having longer lengths in the multicast section of frames or the unicast section of frames, or combinations thereof.

\* \* \* \* \*